Dec. 2, 1958  E. F. DRUSCHEL ET AL  2,862,728
DETACHABLE COUPLING DEVICE WITH ALIGNMENT MEANS
Filed Jan. 25, 1955

EDWARD F. DRUSCHEL
WILLIAM A. SCANGA
INVENTORS

BY *Thomas J. Holden*
ATTORNEY

United States Patent Office 2,862,728
Patented Dec. 2, 1958

2,862,728
DETACHABLE COUPLING DEVICE WITH ALIGNMENT MEANS

Edward F. Druschel, Birdsboro, Pa., and William A. Scanga, Baltimore, Md., assignors to Aircraft Armaments, Inc., Cockeysville, Md., a corporation of Maryland Application January 25, 1955, Serial No. 483,946

1 Claim. (Cl. 285—24)

This invention relates to a quick acting connector for coupling waveguide sections together. Because of the construction of the standard waveguide flanges and chokes used to couple together sections of waveguides, and the necessity for making electrically tight connections to prevent energy losses, screws or bolts are generally used as fastening devices. While such an arrangement is suitable for permanent installations, it is undesirable for laboratory or experimental purposes, or for other applications where frequent coupling and uncoupling of waveguide components is necessary.

The coupler of this invention provides a method for quickly coupling and uncoupling waveguide components and eliminates the time consuming use of screws or bolts for this purpose. Thus a method of coupling is provided which gives an electrically tight connection but allows rapid assembly or disassembly of waveguide connections without the use of tools or loose parts of any description.

Briefly, the device of this invention comprises a series of pivoted dogs arranged to be carried by the choke at the end of a waveguide section, and a rotatable collar operable to clamp the dogs against the back of the flange on the mating waveguide section to force the flange and the choke tightly together. Pins are provided to properly align the choke and the flange, and a spring maintains the dogs in open position when the mating sections are disassembled. The device is simple and unique and fills a long felt need in the electronics field for a quick acting connector for waveguide connections.

It is the object of this invention, therefore, to provide a simple and novel quick acting connector for standard waveguide components.

It is another object of this invention to provide a coupling device for waveguide connections which is operable by hand and requires no tools for assembly and disassembly.

It is a further object of this invention to provide a quick acting waveguide coupler which will maintain an efficient and electrically tight connection between mating waveguide components.

These and further objects will become apparent from the following description taken in connection with the accompanying claim and drawings.

Figure 1:
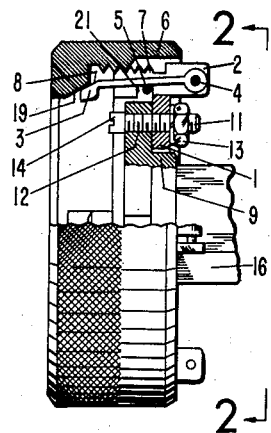
Figure 1 is a partial sectional view showing the coupler of this invention attached to the choke flange of a length of conventional waveguide.
Figure 2:
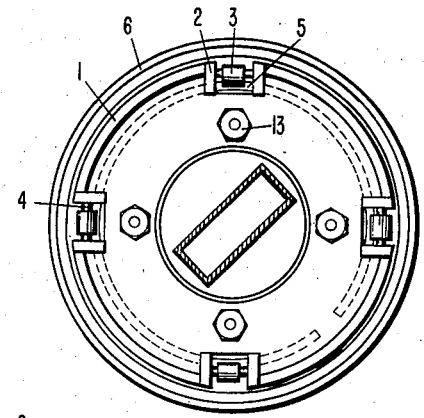
Figure 2 is a view taken along line 2—2 of Figure 1.
Figure 3:
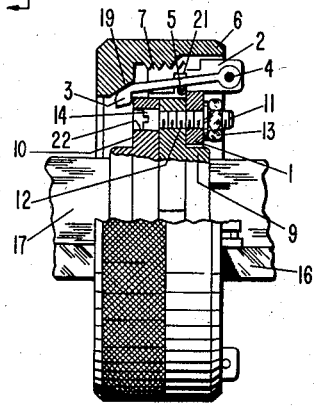
Figure 3 is a partial sectional view showing two sections of waveguide coupled together by the coupler.

As shown in Figure 1, the coupling comprises a ring shaped base plate 1 which carries a series of pairs of projections 2 spaced at intervals around its periphery. A dog 3 is pivotally carried between each pair of projections 2 by means of a pin 4. A resilient expander ring 5 is carried within slots 21 formed in the base plate 1 and serves to urge the dogs 3 into the open position depicted in Figure 1. In an alternative arrangement, individual springs may be provided for each dog, although only the expander ring arrangement is shown in the drawing.

A knurled collar 6 is carried by threads 7 which extend around the outer edge of base plate 1 so that rotation of the collar on the threads will cause axial movement of the collar with respect to the base plate 1. Each dog 3 has an inclined surface 8 at its free end against which the chamfered interior surface 19 of the collar 6 is adapted to act, when rotated on threads 7, to urge the dogs 3 inward against the action of expander ring 5.

Figure 4:
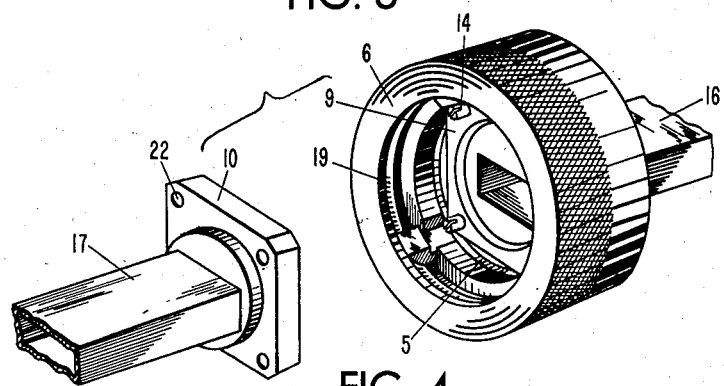
Figure 4 is a perspective view showing two mating lengths of waveguide with one length carrying the coupler of this invention in position to receive the mating length.

Figure 4 shows two mating waveguide sections 16 and 17 fitted with a standard choke fitting 9 and a standard flange 10 respectively, and equipped with the quick acting coupler of this invention.

In use, the quick disconnect coupler is attached to the choke fitting 9 by means of studs 11 which are threadedly engaged in holes 12 in the choke. The studs extend through base plate 1 and are secured by nuts 13. The heads 14 of the studs protrude from the face of the choke fitting 9 to form aligning pins for engaging the corresponding holes 22 in flange 10.

To couple the two waveguide sections 16 and 17 together, the flange 10 is inserted in the collar 6 and located on the aligning pins 14. While held in this position the collar 6 is rotated on the threads 7 to cause the chamfered surface 19 to impinge against the free ends of the dogs 3, swinging the dogs about the pins 4 against the action of expander ring 5 to lock against the rear surface of the flange 10 thus clamping the mating surfaces of the choke 9 and the flange 10 tightly together.

To disassemble, it is necessary only to rotate the collar 6 in the opposite direction, releasing the dogs 3 and allowing the action of expander ring 5 to force them apart to allow the flange 10 to be withdrawn from the aligning pins 14.

Thus waveguide sections and components equipped with the coupler of this invention can be quickly and easily connected and disconnected by hand without the use of any tools or other special devices. This is essential in experimental set-ups where frequent changes are made, or on equipment where interchangeable connections are desired. It is especially useful for test equipment and is rugged and versatile, being adaptable to many types and sizes of waveguide fittings.

Although only one embodiment of this invention has been shown and described, it is obvious that changes and modifications may be made without departing from the spirit of the invention or the scope of the appended claim.

We claim:

A waveguide coupling for connecting together mating waveguide elements having abutting end flanges, comprising a circular member having an opening formed centrally therein, thread means formed on the outer periphery of said circular member, means forming a plurality of slots equally spaced around said outer periphery, a pair of projections carried by said circular member at one end of each of said slots, an arm pivotally connected between each said pair of projections and extending through each said slot to project beyond the other end of said slot, an inwardly directed projection formed on the free end of each said arm, a spring engaging said arms and acting to pivot said arms in a direction radially outward from the axis of said circular member, a plurality of threaded studs attaching said base plate to one of said flanges and extending beyond the abutting face of said flange to form aligning pins for engaging the other of said flanges to hold said flanges in alignment, a collar carried by said thread means and rotatable thereon for axial movement with respect to said circular member, and an inclined surface formed around the inner periphery of said collar for engaging said free end of each of said arms upon rotation of said collar in one direction to pivot said arms against the action of said spring whereby to cause said inwardly directed projections to engage said other of said flanges and hold both said flanges in aligned juxtaposition, rotation of said collar in the opposite direction being effective to allow said arms to be pivoted outwardly by said spring to release said other of said flanges.

References Cited in the file of this patent
UNITED STATES PATENTS

| | | |
|---|---|---|
| 953,061 | Ruland | Mar. 29, 1910 |
| 978,957 | Sutton | Dec. 20, 1910 |
| 1,369,304 | Schram | Feb. 22, 1921 |
| 1,586,276 | Woodruff | May 25, 1926 |
| 1,593,791 | Butler | July 27, 1926 |
| 2,317,729 | Bruno | Apr. 24, 1943 |
| 2,643,139 | Hamilton | June 23, 1953 |
| 2,694,584 | Miller | Nov. 16, 1954 |